United States Patent
Lovley, II

(10) Patent No.: US 9,103,138 B2
(45) Date of Patent: Aug. 11, 2015

(54) SLIDING-EAVE MOUNT MECHANISM FOR CANOPY STRUCTURE

(71) Applicant: BRAVO SPORTS, Santa Fe Springs, CA (US)

(72) Inventor: Jack B. Lovley, II, Lake Forest, CA (US)

(73) Assignee: BRAVO SPORTS, Santa Fe Springs, CA (US)

( * ) Notice: Subject to any disclaimer, the term of this patent is extended or adjusted under 35 U.S.C. 154(b) by 0 days.

(21) Appl. No.: 14/043,752

(22) Filed: Oct. 1, 2013

(65) Prior Publication Data

US 2014/0090682 A1 Apr. 3, 2014

Related U.S. Application Data

(60) Provisional application No. 61/708,938, filed on Oct. 2, 2012.

(51) Int. Cl.
| | |
|---|---|
| *E04H 15/46* | (2006.01) |
| *F16B 7/10* | (2006.01) |
| *E04H 15/34* | (2006.01) |
| *E04H 15/50* | (2006.01) |

(52) U.S. Cl.
CPC .............. *E04H 15/34* (2013.01); *E04H 15/46* (2013.01); *E04H 15/50* (2013.01); *F16B 7/10* (2013.01)

(58) Field of Classification Search
CPC ......... E04H 15/48; E04H 15/46; E04H 15/34; E04H 15/44; E04H 15/50; F16B 7/10; F16B 7/12; F16B 7/042; F16B 7/105; F16M 11/26
USPC .......... 135/121, 131, 135, 139–142, 144–145, 135/114, 120.2–120.3; 403/109.1–109.3, 403/322.2, 327, 329; 248/188.2, 188.5
See application file for complete search history.

(56) References Cited

U.S. PATENT DOCUMENTS

| | | | | |
|---|---|---|---|---|
| 2,989,968 | A * | 6/1961 | Heinz | 135/75 |
| 5,387,048 | A * | 2/1995 | Kuo | 403/109.3 |
| 5,433,552 | A * | 7/1995 | Thyu | 403/378 |
| 5,511,572 | A * | 4/1996 | Carter | 135/145 |
| 6,508,262 | B1 * | 1/2003 | Takayama | 135/145 |
| 6,575,656 | B2 * | 6/2003 | Suh | 403/109.6 |
| 6,676,092 | B2 * | 1/2004 | Tsai | 248/97 |
| 7,066,676 | B2 * | 6/2006 | Tsai | 403/109.3 |
| 7,240,685 | B2 * | 7/2007 | Seo | 135/120.3 |

(Continued)

FOREIGN PATENT DOCUMENTS

| | | | | | |
|---|---|---|---|---|---|
| JP | 2001003604 | A | * | 1/2001 | E04H 15/34 |
| JP | 2005290837 | A | * | 10/2005 | E04H 15/44 |

*Primary Examiner* — Winnie Yip
(74) *Attorney, Agent, or Firm* — Knobbe, Martens, Olson & Bear, LLP

(57) ABSTRACT

A collapsible canopy structure includes one or more eaves, one or more fixed eave mounts, one or more sliding eave mounts and one or more vertical poles. Each of the vertical poles has a top end and a bottom end. Each of the vertical poles is connected by at least one of the one or more eaves. At least one of the fixed eave mounts is coupled to at least one of the eaves and attached proximate to the top end of at least one of the vertical poles. At least one of the sliding eave mounts is coupled to at least one of the eaves and slidingly coupled to one of the vertical poles between its top end and its bottom end. One or more detent elements include a round or spherical detent surface that engages an opening of the one or more vertical poles.

8 Claims, 7 Drawing Sheets

(56) References Cited

U.S. PATENT DOCUMENTS

| | | | |
|---|---|---|---|
| 7,380,563 B2 * | 6/2008 | Seo | 135/145 |
| 7,395,830 B2 * | 7/2008 | Seo | 135/140 |
| 7,922,416 B2 * | 4/2011 | Davis et al. | 403/322.1 |
| 8,616,226 B2 * | 12/2013 | Ma et al. | 135/145 |
| 2006/0062632 A1 * | 3/2006 | Jang | 403/109.6 |

* cited by examiner

SLIDING-EAVE MOUNT MECHANISM FOR CANOPY STRUCTURE

INCORPORATION BY REFERENCE TO RELATED APPLICATIONS

Any and all priority application identified in the Application Data Sheet, or any correction thereto, are hereby incorporated by reference herein and made a part of the present disclosure.

BACKGROUND

1. Field of the Invention

The inventions disclosed herein relate generally to canopy structures, including sliding-eave mount mechanisms for canopy structures.

2. Description of the Related Art

Collapsible canopy structures often include corner and/or side vertical support members, which together support collapsible eaves and central frame structures. The vertical support members often include a fixed mount and a sliding mount. The sliding mount is movable relative to the vertical support member to permit the collapse or deployment of the eaves and central frame structures. The sliding mount is often locked into a deployed position relative to the vertical support member by a pop-pin arrangement, which can be difficult to actuate.

SUMMARY OF THE INVENTION

Therefore, a need exists for improved retention or lock assemblies for sliding eave mounts or other similar movable portions of a collapsible canopy (e.g., leg height locking arrangement). The systems, methods and devices described herein have innovative aspects, no single one of which is indispensable or solely responsible for their desirable attributes. Without limiting the scope of the claims, some of the advantageous features will now be summarized.

A collapsible canopy structure includes one or more eaves, one or more fixed eave mounts, one or more sliding eave mounts and one or more vertical poles. Each of the vertical poles has a top end and a bottom end. Each of the vertical poles is connected by at least one of the one or more eaves. At least one of the fixed eave mounts is coupled to at least one of the eaves and attached proximate to the top end of at least one of the vertical poles. At least one of the sliding eave mounts is coupled to at least one of the eaves and slidingly coupled to one of the vertical poles between its top end and its bottom end. One or more detent elements include a round or spherical detent surface that engages an opening of the one or more vertical poles.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

For the purpose of understanding particular embodiments, reference will be made to the drawings.

Figure 1:
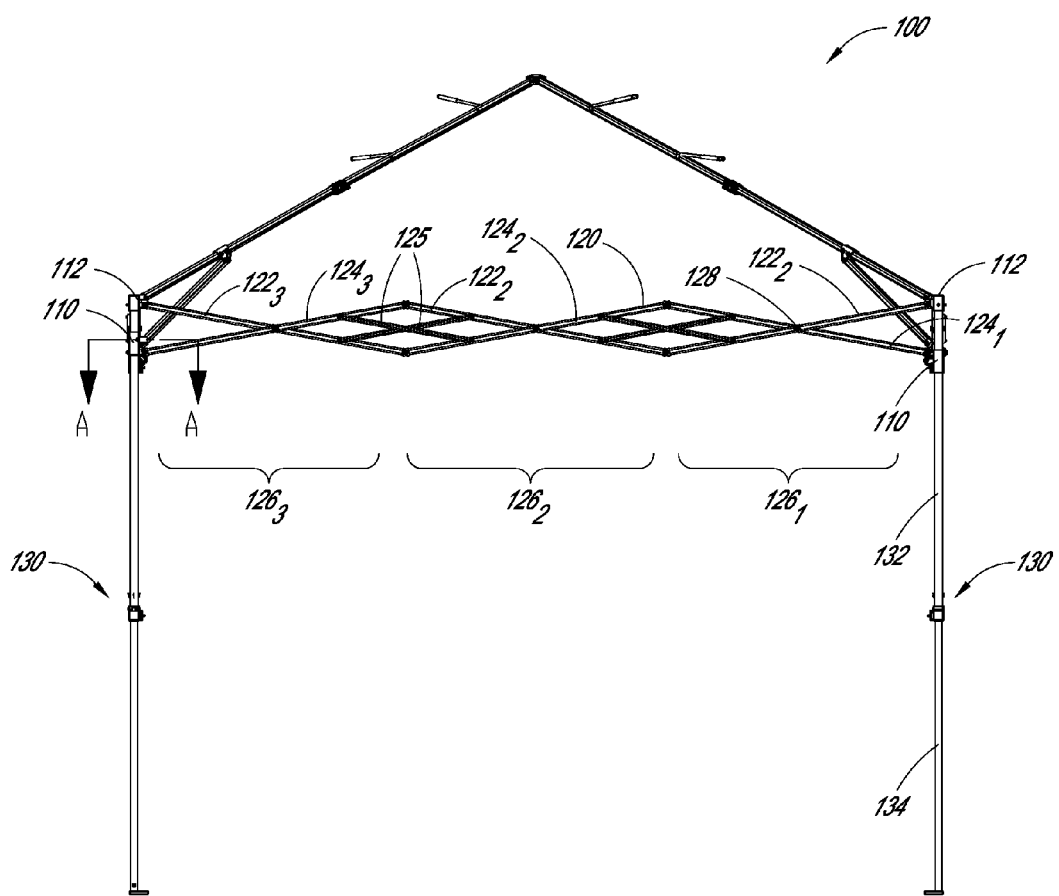
FIG. 1 is an elevation view of a collapsible canopy structure having certain features aspects and advantages of the present sliding eave mount arrangement.

FIG. 1 shows a front elevation view of one embodiment of a canopy frame 100 for a collapsible canopy shelter. The canopy frame 100 typically supports a shade or cover element, such as a canvas or other fabric or collapsible cover, among other possible materials or arrangements. In this embodiment, canopy frame 100 comprises a plurality of eaves 120 linking a plurality of upwardly extending poles 130. In some embodiments, the upwardly extending poles 130 can comprise a plurality of telescoping pole members. For example, the upwardly extending poles 130 can comprise a top telescoping pole member 132 and a bottom telescoping pole member 134. In other configurations, more than two pole members can be provided, such as three, four or more for example. Each eave 120 may comprise at least one and, preferably, a series of pivotally coupled scissor-jack members 126$_1$, 126$_2$, 126$_3$, . . . 126$_N$. Each scissor-jack member 126$_1$, 126$_2$, 126$_3$, . . . 126$_N$ may include a first cross member 122$_1$, 122$_2$, 122$_3$, . . . 122$_N$ and a second cross member 124$_1$, 124$_2$, 124$_3$, . . . 124$_N$, crossed and pivotally coupled at a cross point 128. In some embodiments, to provide additional rigidity to improve the structural integrity of canopy frame 10, one or more (e.g., two) reinforcing cross members 125 may be crossed and pivotally coupled to the first cross members and second cross members at each intersection of scissor jack members 126$_1$, 126$_2$, 126$_3$, . . . 126$_N$. All pivoting joints may be pinned, bolted, riveted, joined by rotational fasteners, or otherwise rotatively connected as is known in the art.

Each eave 120 can be collapsibly coupled to a pair of upwardly extending poles 130 through a pair of fixed eave mounts 112 and a pair of sliding eave mounts 110 (one of each mount 110 and 112 associated with each pole 130). Fixed eave mounts 112 may be fixably coupled to the top ends of the upwardly extending poles 130, and sliding eave mounts 110 can be slidably coupled to the poles 130 such that sliding eave mounts 110 can slide in an axial direction or, in other words, the direction of the length of upwardly extending poles 130. The cross members 122, 124 can be pivotally coupled to the eave mounts 110, 112. For example, first cross member 122$_1$ can be pivotally coupled to a first fixed eave mount 112, and first cross member 122$_3$ can be pivotally coupled to a second fixed eave mount 112. Second cross member 124$_1$ can be pivotally coupled to a first sliding eave mount 110, and second cross member 124$_3$ can be pivotally coupled to a second sliding eave mount 110. As shown in FIG. 1, the sliding eave mounts 110 are shown in a fixed extended or deployed position such as when a canopy is in a fully-opened position. When the sliding eave mounts 110 are slid away from the fixed eave mounts 112 (e.g., down the upwardly extending poles 130 in a downward direction denoted by the arrow A), the canopy frame 110 can transition from a fully-opened position to a closed position, and scissor-jack members $126_1$, $126_2$, $126_3$, ... $126_N$ can collapse toward a positioned generally aligned with the poles 130 and with one another in a manner similar to the compression of an accordion.

Figure 2:
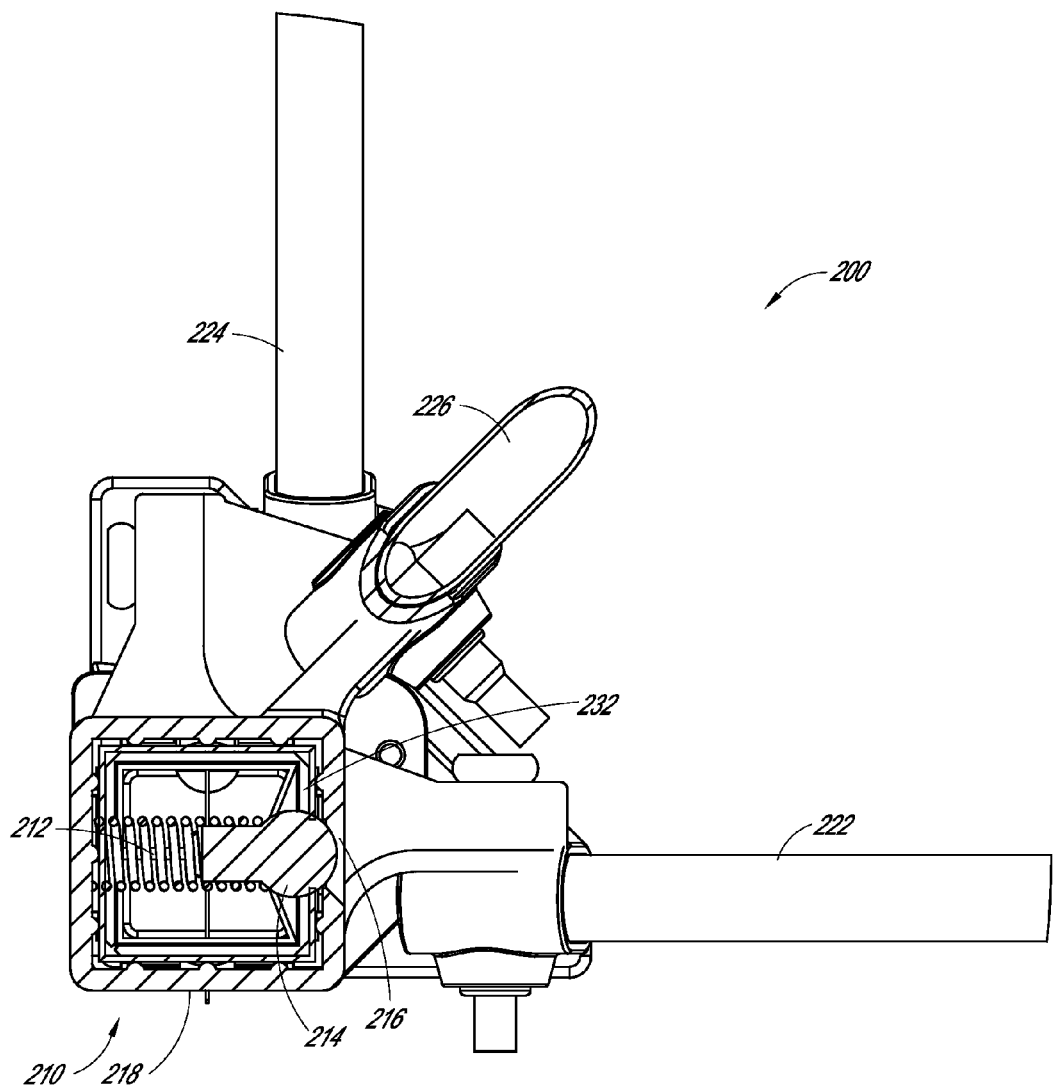
FIG. 2 is a partial sectional top view of one of the support legs or poles illustrating an embodiment of a sliding eave mount arrangement having an internal detent member or ball.

FIG. 2 shows a top view of a cross section of a portion of an embodiment of a canopy frame 200, which can be the same as or similar to the canopy frame 100 of FIG. 1. In particular, sliding eave mount 210 can be slidably coupled to an upwardly extending pole 232 and pivotally coupled to cross members 222 and 224 and additional support member 226. The sliding eave mount 210 can comprise an outer wall 218, a spring 212, a detent member or ball 214, and an opening 216. The upwardly extending pole 232 similarly can comprise an opening that can align with the opening 216 in the sliding eave mount 210. Interior walls of the sliding eave mount 210 can be slidably coupled to exterior walls of the upwardly extending pole 232. As illustrated in FIG. 2, the sliding eave mount 210 is shown in a fixed position such as when the canopy frame 200 is in a fully-opened position. In this embodiment, the spring 212 can be provided in the interior space of the sliding eave mount 210 and upwardly extending pole 232. The spring 212 can be configured to engage the ball 214, such as by surrounding a shaft portion of the ball 214, and urge the ball 214 toward the opening 216 such that, when aligned, a portion of the ball 214, which preferably is a rounded or spherical (semi-spherical, as illustrated herein) portion, engages the opening 216 to hold the sliding eave mount 210 in place relative to the upwardly extending pole 232. A first end of the spring 212 can engage the ball 214 to provide a force that can push the ball 214 into the opening 216. In different embodiments, the spring 212 can comprise any suitable material and be any suitable type of spring, including a compression coil spring, for example. In addition, the spring 212 can be any suitable stiffness. In some embodiments, a second end of the spring can engage an interior wall of the upwardly extending pole 232. In alternative embodiments, a screw member (not shown) provided in the upwardly extending pole 232 can be aligned and engaged with the second end of the spring 212. A hole in the sliding eave mount 210 can provide access to the screw member. By adjusting the position of the screw member, the spring 212 can be further compressed and the tension in the spring 212 thereby can be adjusted. Adjusting the tension in the spring 212 can be used to adjust the force pressing the ball 214 into the opening 216.

A method of opening and closing the canopy frame 200 will now be described. When the sliding eave mount 210 is in a fixed position such as when the canopy frame 200 is in an opened state, the ball 214 is engaged with the opening 216 via a force applied by the spring 212 to hold the sliding eave mount 210 in place. In some embodiments, less than half of the surface of the ball 214 is exposed through the opening 216 when the sliding eave mount 210 is in a fixed engaged position. In different embodiments, the portion of the surface area of the ball 214 exposed through the opening 216 can vary depending on the size of the opening 216 and the size of the ball 214. To move the sliding eave mount 210 to transition the canopy frame 200 from an opened to a closed position, a user can push the ball 214 inwards, either directly or via an intermediate actuation member or arrangement, to disengage the ball 214 from the opening 216. When the ball 214 is retracted beyond an interior surface of the sliding eave mount 210 and disengages the opening 216, the sliding eave mount 210 can be moved relative to the upwardly extending pole 232. Moving each of the sliding eave mounts 210 downwards along the respective upwardly extending poles 232 can transition the canopy frame 200 from an opened to a closed state and can cause the eaves to collapse in a manner similar to the compression of an accordion. To transition the canopy frame 200 from a closed state to an opened state, a user can slide the sliding eave mount 210 upwards along the upwardly extending pole 232 until the opening 216 of the sliding eave mount 210 is aligned with the opening in the upwardly extending pole 232 and the spring 212 engages the ball 214 with the opening 216.

In some embodiments, to move the sliding eave mount 210 to transition the canopy frame 200 from an opened to a closed position, a user can simply push downwards on the sliding eave mount 210. Although the spring 212 and ball 214 can engage the opening 216 to hold the sliding eave mount 210 in place, if a sufficient downward force is applied to the sliding eave mount 210, the sliding eave mount 210 can overcome the engagement force of the spring 212 and ball 214, compressing the spring 212 and ball 214 inward to disengage it from the opening 216. Eaves that are interconnected with other sliding eave mounts on other poles can transfer the downward force to the remaining sliding eave mounts. This method advantageously allows a user to apply a downward force at a single sliding eave mount in order to transition an entire canopy frame from an opened to a closed state. For example, for a rectangular canopy frame comprising four upwardly extending poles and four sliding eave mounts, a user can transition the canopy frame from an opened to a closed state by applying a downward force to any one of the four sliding eave mounts. The downward force applied by the user can overcome the engagement force of each spring and ball in each sliding eave mount, allowing the user to move the sliding eave mounts and collapse the canopy frame without directly disengaging each of the sliding ease mounts individually. Such an arrangement is in contrast with cylindrical pins used in existing canopy structures, which will not retract or release as a result of downward force and often are difficult to actuate. Therefore, an aspect of the present invention involves the realization that a rounded or spherical ball or detent member unexpectedly is sufficient to maintain the sliding eave mount in a locked position during normal use conditions of the canopy, but substantially eases unlocking of the sliding eave mount and, thus, collapsing of the canopy.

Figure 3:
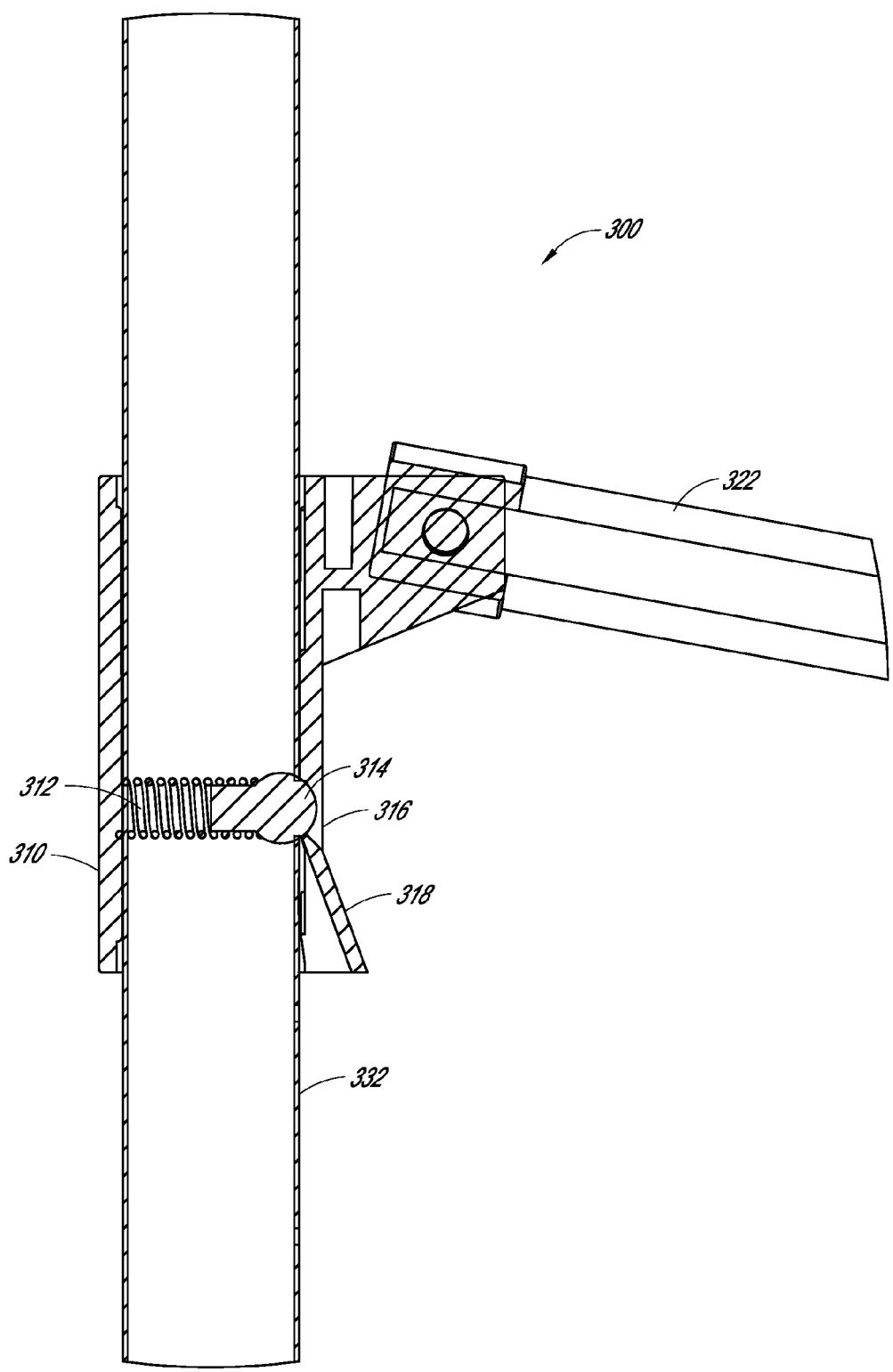
FIG. 3 is a sectional side view of one of the support legs or poles illustrating an embodiment of a sliding eave mount arrangement having an internal detent member or ball.

FIG. 3 shows a side cross-sectional view of a portion of an embodiment of a canopy frame 300, which can be the same as or similar to the canopies of FIG. 1 or 2. In particular, sliding eave mount 310 can be slidably coupled to an upwardly extending pole 332 and pivotally coupled to cross member 322. The sliding eave mount 310 can comprise an outer wall 318, a spring 312, a ball 314, and an opening 316. The upwardly extending pole 332 similarly can comprise an opening that can align with the opening 316 in the sliding eave mount 310. Interior walls of the sliding eave mount 310 can be slidably coupled to exterior walls of the upwardly extending pole 332. As illustrated in FIG. 3, the sliding eave mount 310 is shown in a fixed position such as when the canopy frame 300 is in a fully-opened position. The spring 312 can be configured to engage the ball 314 with the opening 316 to hold the sliding eave mount 310 in place relative to the upwardly extending pole 332. A first end of the spring 312 can engage the ball 314 to provide a force that can push the ball 314 into the opening 316. In different embodiments, the spring 312 can comprise any suitable material and be any suitable type of spring, including a compression coil spring.

In addition, the spring 312 can be any suitable stiffness. In some embodiments, a second end of the spring 312 can engage an interior wall of the upwardly extending pole 332. In alternative embodiments, a screw member (not shown) provided in the upwardly extending pole 332 can be aligned and engaged with the second end of the spring 312. A hole in the sliding eave mount 310 can provide access to the screw member. By adjusting the position of the screw member, the spring 312 can be further compressed and the tension in the spring 312 thereby can be adjusted. Adjusting the tension in the spring 312 can be used to adjust the force pressing the ball 314 into the opening 316.

Figure 4:
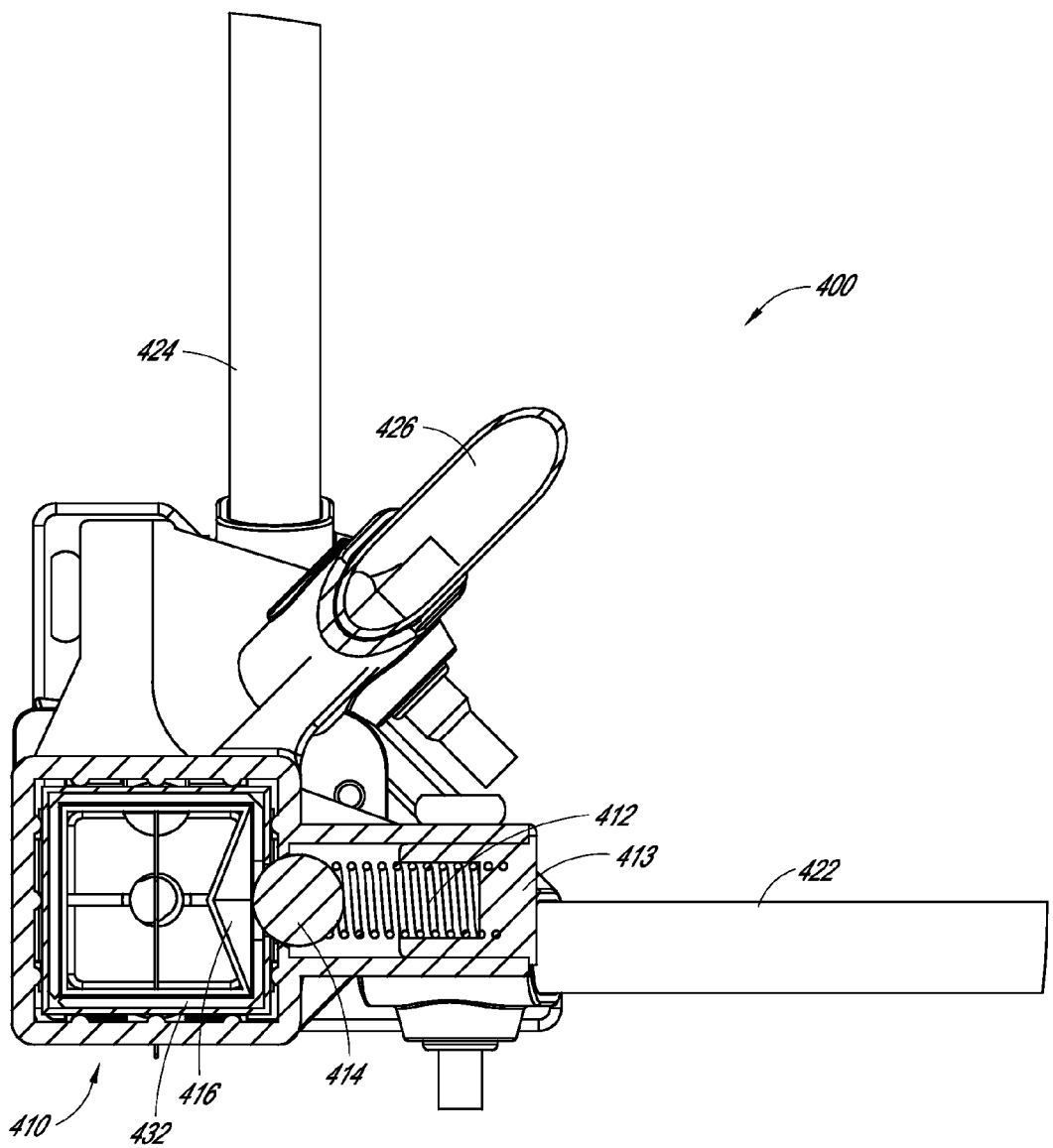
FIG. 4 is a partial sectional top view of one of the support legs or poles illustrating another embodiment of a sliding eave mount arrangement having an external detent member or ball.

FIG. 4 shows a top view of a cross section of a portion of an embodiment of a canopy frame 400, which can be the same as or similar to the canopies of FIGS. 1-3, but includes a different sliding eave mount detent arrangement. In particular, sliding eave mount 410 can be slidably coupled to an upwardly extending pole 432 and pivotally coupled to cross members 422 and 424 and additional support member 426. The sliding eave mount 410 can comprise an outer wall 418, a spring 412, a ball 414, and an internal opening 416. The upwardly extending pole 432 similarly can comprise an opening that can align with the internal opening 416 in the sliding eave mount 410. Interior walls of the sliding eave mount 410 can be slidably coupled to exterior walls of the upwardly extending pole 432. As illustrated in FIG. 4, the sliding eave mount 410 is shown in a fixed position such as when the canopy frame 400 is in a fully-opened position. In this embodiment, the spring 412 can be provided within the interior space of the sliding eave mount 410 but on the exterior of the upwardly extending pole 432. The spring 412 can be configured to engage the ball 414 with the internal opening 416 to hold the sliding eave mount 410 in place relative to the upwardly extending pole 432. A first end of the spring 412 can engage the ball 414 to provide a force that can push the ball 414 into the internal opening 416. In different embodiments, the spring 412 can comprise any suitable material and be any suitable type of spring, including a compression coil spring. In addition, the spring 412 can be any suitable stiffness. In some embodiments, a screw member 413 can be provided in the sliding eave mount 410 and can be aligned and engaged with the second end of the spring 412. By adjusting the position of the screw member 413, the spring 412 can be further compressed and the tension in the spring 412 thereby can be adjusted. Adjusting the tension in the spring 412 can be used to adjust the force pressing the ball 414 into the internal opening 416. In alternative embodiments, a second end of the spring 412 can engage an interior wall of the sliding eave mount 410.

A method of opening and closing the canopy frame 400 will now be described. When the sliding eave mount 410 is in a fixed position such as when the canopy frame 400 is in an opened state, the spring 412 and ball 414 are engaged with the internal opening 416 to hold the sliding eave mount 410 in place. In some embodiments, less than half of the surface of the ball 414 is exposed through the internal opening 416 on the interior of the upwardly extending pole 432 when the sliding eave mount 410 is in a fixed engaged position. In different embodiments, the portion of the surface area of the ball 414 exposed through the internal opening 416 can vary depending on the size of the opening 416 and the size of the ball 414. To move the sliding eave mount 410 to transition the canopy frame 400 from an opened to a closed position, a sufficient downward force can be applied to the sliding eave mount 410. The downward force can cause the sliding eave mount 410 to overcome the engagement force of the spring 412 and ball 414, compressing the spring 412 and ball 414 to disengage it from the internal opening 416. When the ball 414 is compressed past the exterior of the upwardly extending pole 432, the sliding eave mount 410 can be disengaged from the internal opening 416 and can freely move relative to the upwardly extending pole 432. This method of closing advantageously allows a user to apply a downward force at a single sliding eave mount in order to transition an entire canopy frame from an opened to a closed state. For example, for a rectangular canopy frame comprising four upwardly extending poles and four sliding eave mounts, a user can transition the canopy frame from an opened to a closed state by applying a downward force to any one of the four sliding eave mounts. The downward force applied by the user can overcome the engagement force of each spring and ball in each sliding eave mount, allowing the user to move the sliding eave mounts and collapse the canopy frame without directly disengaging each of the sliding ease mounts individually. To transition the canopy frame 400 from a closed state to an opened state, a user can slide the sliding eave mount 410 upwards along the upwardly extending pole 432 until the internal opening 416 of the sliding eave mount 410 is aligned with the opening in the upwardly extending pole 432 and the spring 412 engages the ball 414 with the internal opening 416.

Figure 5:
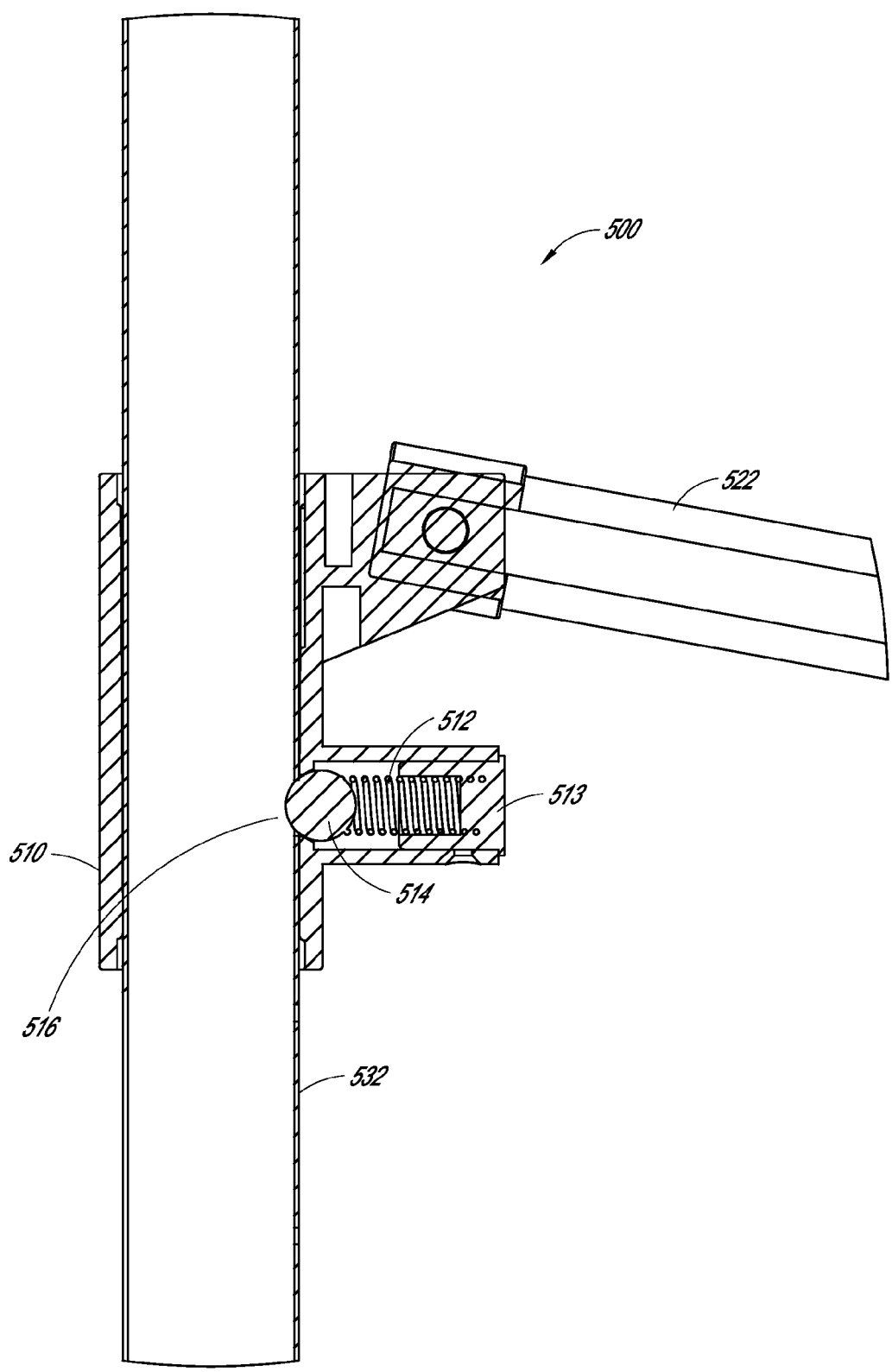
FIG. 5 is a sectional side view of one of the support legs or poles illustrating another embodiment of a sliding eave mount arrangement having an external detent member or ball.

FIG. 5 shows a side cross-sectional view of a portion of an embodiment of a canopy frame 500, which can be the same as or similar to the canopy frames of FIGS. 1-4. In particular, sliding eave mount 510 can be slidably coupled to an upwardly extending pole 532 and pivotally coupled to cross member 522. The sliding eave mount 510 can comprise an outer wall 518, a spring 512, a ball 514, and an internal opening 516. The upwardly extending pole 532 similarly can comprise an opening that can align with the internal opening 516 in the sliding eave mount 510. Interior walls of the sliding eave mount 510 can be slidably coupled to exterior walls of the upwardly extending pole 532. As illustrated in FIG. 5, the sliding eave mount 510 is shown in a fixed position such as when the canopy frame 500 is in a fully-opened position. The spring 512 can be configured to engage the ball 514 with the internal opening 516 to hold the sliding eave mount 510 in place relative to the upwardly extending pole 532. A first end of the spring 512 can engage the ball 514 to provide a force that can push the ball 514 into the internal opening 516. In different embodiments, the spring 512 can comprise any suitable material and be any suitable type of spring, including a compression coil spring. In addition, the spring 512 can be any suitable stiffness. In some embodiments, the sliding eave mount 510 can comprise a screw member 513 aligned and engaged with a second end of the spring 512. By adjusting the position of the screw member 513, the spring 512 can be further compressed and the tension in the spring 512 thereby can be adjusted. Adjusting the tension in the spring 512 can be used to adjust the force pressing the ball 514 into the internal opening 516, thereby adjusting the downward force on the sliding eave mount 510 that allows transition from an opened to a closed state.

Figure 6:
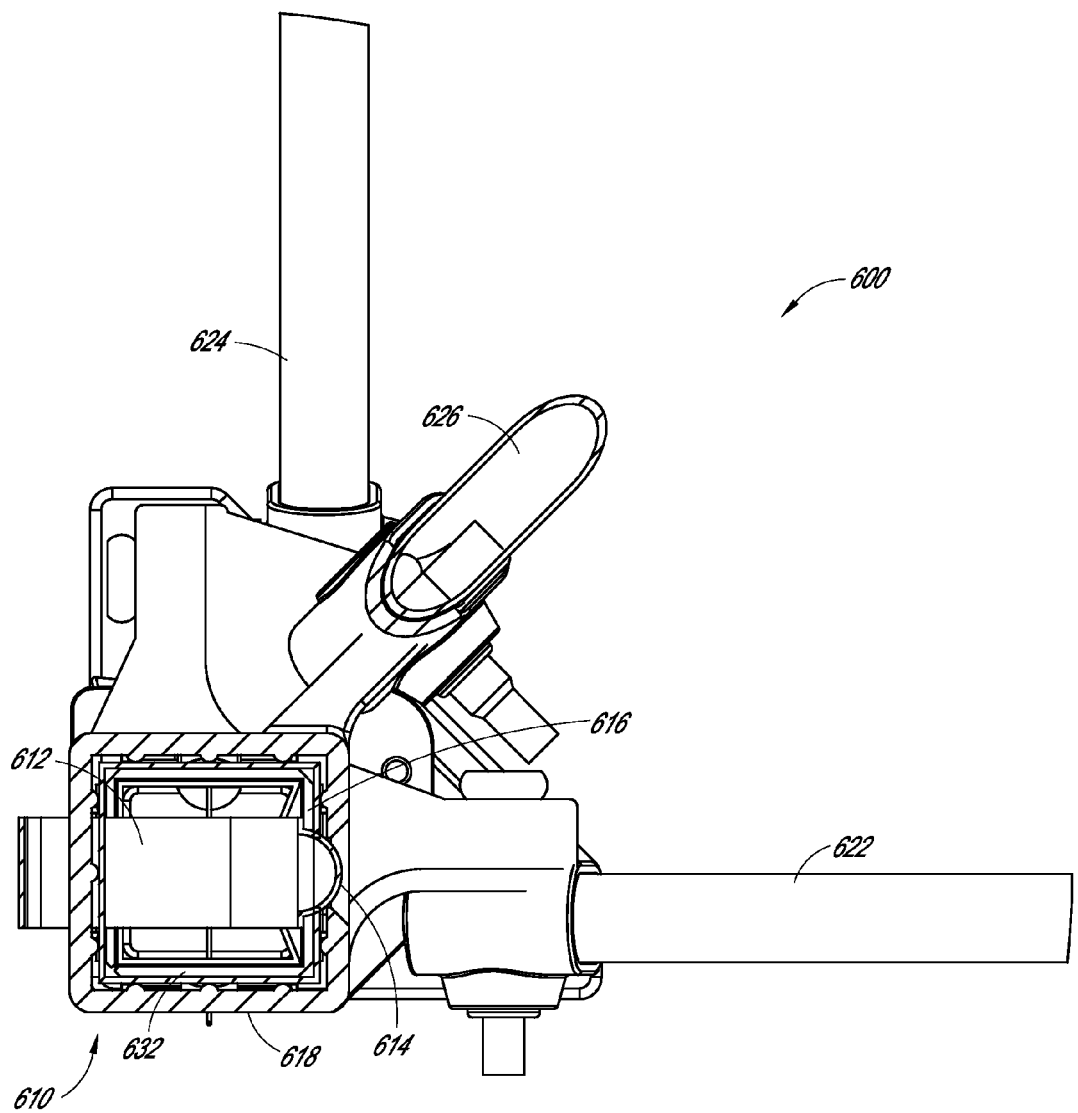
FIG. 6 is a partial sectional top view of one of the support legs or poles illustrating an embodiment of a sliding eave mount arrangement having an internal detent member or spring plate.

FIG. 6 shows a top view of a cross section of a portion of an embodiment of a canopy frame 600, which can be the same as or similar to the canopy frames of FIGS. 1-5, but preferably includes a different sliding eave mount detent arrangement. In particular, sliding eave mount 610 can be slidably coupled to an upwardly extending pole 632 and pivotally coupled to cross members 622 and 624 and additional support member 626. The sliding eave mount 610 can comprise an outer wall 618, a spring or detent member 612 having a preferably round or spherical end or detent portion 614, and an opening 616. The upwardly extending pole 632 similarly can comprise an opening that can align with the opening 616 in the sliding eave mount 610. Interior walls of the sliding eave mount 610 can be slidably coupled to exterior walls of the upwardly extending pole 632. As illustrated in FIG. 6, the sliding eave mount 610 is shown in a fixed position such as when the canopy frame 600 is in a fully-opened position. In this embodiment, the spring 612 can be provided in the interior space of the sliding eave mount 610 and upwardly extending pole 632. The spring 612 can be configured to engage the spring end portion 614 with the opening 616 to hold the sliding eave mount 610 in place relative to the upwardly extending pole 632. The spring 612 can provide a force that engages the spring end portion 614 with the opening 616. In different embodiments, the spring 612 can comprise any suitable material and can be any suitable stiffness. In some embodiments, another end of the spring 612 can engage an interior wall of the upwardly extending pole 632. In alternative embodiments, a screw member (not shown) provided in the upwardly extending pole 632 can be aligned and engaged with the other end of the spring 612. A hole in the sliding eave mount 610 can provide access to the screw member. By adjusting the position of the screw member, the spring 612 can be further compressed and the tension in the spring 612 thereby can be adjusted. Adjusting the tension in the spring 612 can be used to adjust the force pressing the spring end portion 614 into the opening 616.

A method of opening and closing the canopy frame 600 will now be described. When the sliding eave mount 610 is in a fixed position such as when the canopy frame 600 is in an opened state, spring end portion 614 is engaged with the opening 616 to hold the sliding eave mount 610 in place. In some embodiments, less than half of the surface of the spring end portion 614 is exposed through the opening 616 when the sliding eave mount 610 is in a fixed engaged position. In different embodiments, the portion of the surface area of the spring end portion 614 exposed through the opening 616 can vary depending on the size of the opening 616 and the size of the spring end portion 614. To move the sliding eave mount 610 to transition the canopy frame 600 from an opened to a closed position, a user can push the spring end portion 614 inwards to compress the spring 612 and disengage it from the opening 616. When the spring end portion 614 inwardly slides past an interior surface of the sliding eave mount 610 at the opening 616, the sliding eave mount 610 can be disengaged from the opening 616 and can freely move relative to the upwardly extending pole 632. Moving the sliding eave mount 610 downwards along the upwardly extending pole 632 can transition the canopy frame 600 from an opened to a closed state and can cause the eaves to collapse in a manner similar to the compression of an accordion. To transition the canopy frame 600 from a closed state to an opened state, a user can slide the sliding eave mount 610 upwards along the upwardly extending pole 632 until the opening 616 of the sliding eave mount 610 is aligned with the opening in the upwardly extending pole 632 and the spring end portion 614 engages with the opening 616.

In some embodiments, to move the sliding eave mount 610 to transition the canopy frame 600 from an opened to a closed position, a user can simply push downwards on the sliding eave mount 610. Although the spring 612 and spring end portion 614 can engage the opening 616 to hold the sliding eave mount 610 in place, if a sufficient downward force is applied to the sliding eave mount 610, the sliding eave mount 610 can overcome the engagement force of the spring 612 and spring end portion 614, compressing the spring 612 and spring end portion 614 inward to disengage it from the opening 616. Eaves that are interconnected with other sliding eave mounts on other poles can transfer the downward force to the remaining sliding eave mounts. This method advantageously allows a user to apply a downward force at a single sliding eave mount in order to transition an entire canopy frame from an opened to a closed state. For example, for a rectangular canopy frame comprising four upwardly extending poles and four sliding eave mounts, a user can transition the canopy frame from an opened to a closed state by applying a downward force to any one of the four sliding eave mounts. The downward force applied by the user can overcome the engagement force of each spring in each sliding eave mount, allowing the user to move the sliding eave mounts and collapse the canopy frame without directly disengaging each of the sliding ease mounts individually.

Figure 7:
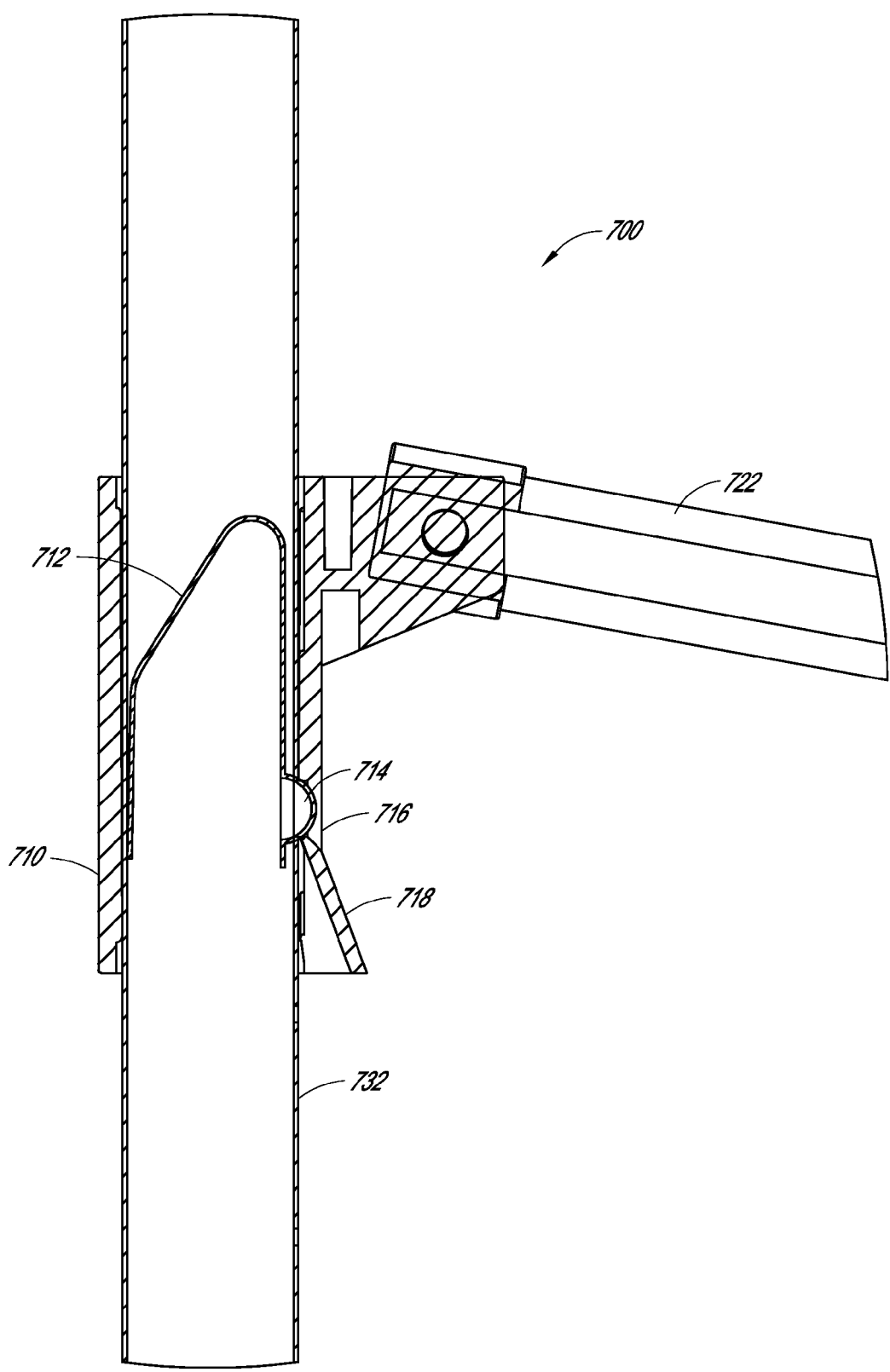
FIG. 7 is a sectional side view of one of the support legs or poles illustrating an embodiment of a sliding eave mount arrangement having an internal detent member or spring plate.

FIG. 7 shows a side cross-sectional view of a portion of an embodiment of a canopy frame 700, which can be the same as or similar to the canopy frames of FIGS. 1-6. In particular, sliding eave mount 710 can be slidably coupled to an upwardly extending pole 732 and pivotally coupled to cross member 722. The sliding eave mount 710 can comprise an outer wall 718, a spring or detent member 712 comprising a preferably round or spherical spring end portion 714, and an opening 716. The upwardly extending pole 732 similarly can comprise an opening that can align with the opening 716 in the sliding eave mount 710. Interior walls of the sliding eave mount 710 can be slidably coupled to exterior walls of the upwardly extending pole 732. As illustrated in FIG. 7, the sliding eave mount 710 is shown in a fixed position such as when the canopy frame 700 is in a fully-opened position. The spring 712 and spring end portion 714 can be configured to engage the opening 716 to hold the sliding eave mount 710 in place relative to the upwardly extending pole 732. In different embodiments, the spring 712 can comprise any suitable material and be any suitable stiffness. In some embodiments, another end of the spring 712 can engage an interior wall of the upwardly extending pole 732. In alternative embodiments, a screw member (not shown) provided in the upwardly extending pole 732 can be aligned and engaged with the other end of the spring 712. A hole in the sliding eave mount 710 can provide access to the screw member. By adjusting the position of the screw member, the spring 712 can be further compressed and the tension in the spring 712 thereby can be adjusted. Adjusting the tension in the spring 712 can be used to adjust the force pressing the spring end portion 714 into the opening 716. The spring 712 preferably is similar or the same as the spring 612. Preferably, the spring 712 is generally U-shaped from a side view having a first leg portion, a second leg portion generally parallel to the first leg portion and a connecting portion between the first and second leg portions. The spring 712 can be constructed from a thin piece of spring steel or other similar or suitable material, including some resilient plastic materials, for example, which provide the first leg portion with resilient movement relative to the second leg portion. Accordingly, the spring end portion or detent member 714 is urged or biased toward engagement with the opening 716. A thickness of the material and/or type of material may be selected to provide a desired spring force. The spring 712 can be secured in place within the canopy leg 732 (e.g., via a fastener or other suitable arrangement) or can be simply positioned within the canopy leg 732 and rely on the spring force of the spring 712 to hold itself in place.

The features and attributes of the specific embodiments disclosed above may be combined in different ways to form additional embodiments, all of which fall within the scope of the present disclosure. Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A collapsible canopy structure comprising:
   one or more eaves;
   one or more fixed eave mounts;
   one or more sliding eave mounts;
   one or more vertical poles, wherein each of the one or more vertical poles comprises a top end and a bottom end, wherein each of the one or more vertical poles is connected by at least one of the one or more eaves, wherein at least one of the one or more fixed eave mounts is coupled to at least one of the one or more eaves and attached proximate to the top end of at least one of the one or more vertical poles, wherein at least one of the one or more sliding eave mounts is coupled to at least one of the one or more eaves and slidingly coupled to one of the one or more vertical poles between its top end and its bottom end; and
   a detent element carried by the at least one of the one or more sliding eave mounts, each of the detent elements comprising a round detent surface that engages a respective one of openings of the one or more vertical poles to secure the at least one of the one or more sliding eave mounts in a fixed position relative to the one of the one or more vertical poles;
   wherein the round detent surface is configured such that downward force on the sliding eave mount can disengage the detent element from the opening of the sliding eave mount or the vertical pole;
   wherein a diameter of the round detent surface is greater than a diameter of the opening.

2. The collapsible canopy structure of claim 1, wherein the detent element is biased toward and engaged position with the opening of the sliding eave mount or the vertical pole by a spring.

3. The collapsible canopy structure of claim 1, wherein the detent element is external to the vertical pole.

4. A collapsible canopy, comprising:
   a plurality of collapsible eaves;
   a plurality of fixed eave mounts;
   a plurality of sliding eave mounts;
   a plurality of vertical legs, wherein the plurality of fixed eave mounts and the plurality of sliding eave mounts connect the plurality of collapsible eaves to the plurality of vertical legs, wherein each of the legs comprises a top end and a bottom end, wherein each of the vertical legs includes one of the fixed eave mounts coupled to the vertical leg proximate to the top end and one of the sliding eave mounts slidingly coupled between the top end and the bottom end of the vertical leg; and
   at least one detent element, wherein each of the at least one detent element is carried by one of the sliding eave mounts, the detent element comprising a round detent surface that engages an opening of an associated one of the vertical legs to secure the sliding eave mount in a fixed position relative to the vertical leg;
   wherein a diameter of the round detent surface is greater than a diameter of the opening such that downward force on the sliding eave mount can disengage the detent element from the opening of the sliding eave mount or the vertical pole.

5. The collapsible canopy of claim 4, wherein the at least one detent element comprises a plurality of detent elements, each of the detent elements associated with one of the sliding eave mounts.

6. The collapsible canopy of claim 4, wherein the detent element is biased toward an engaged position with the opening of the vertical leg by a spring.

7. The collapsible canopy of claim 6, wherein the detent element is positioned below a location at which the associated collapsible eaves are coupled to the sliding eave mount.

8. The collapsible canopy of claim 4, wherein the detent element is external to the vertical leg.

* * * * *